(No Model.)
C. K. BRADFORD.
FISHING REEL.
No. 403,733. Patented May 21 1889.
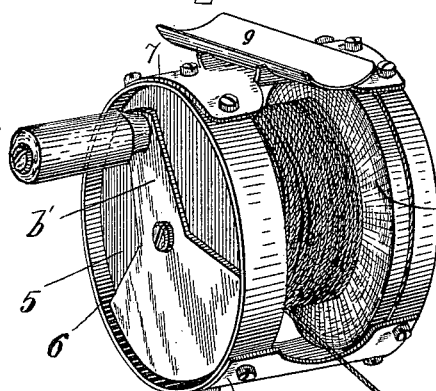
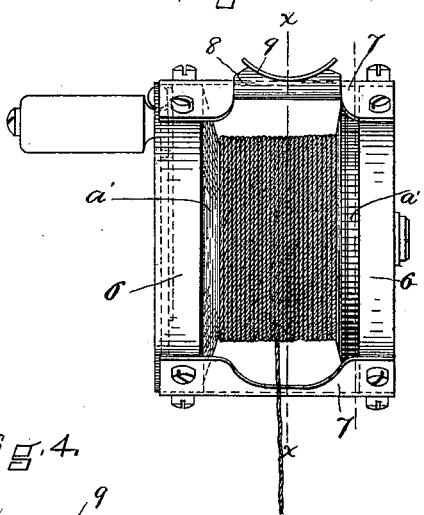
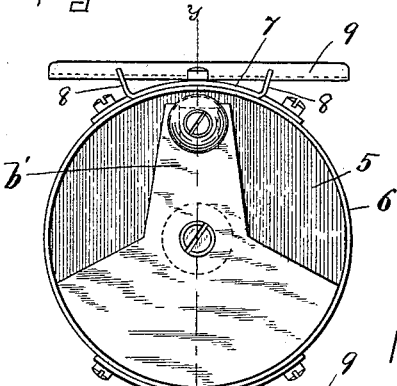
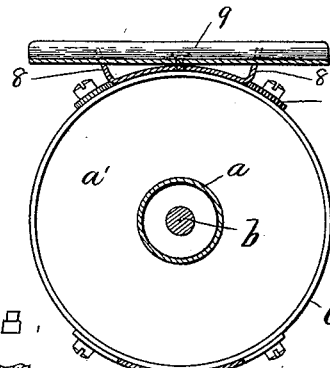
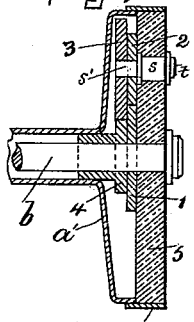
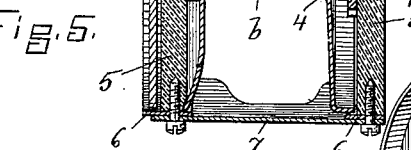
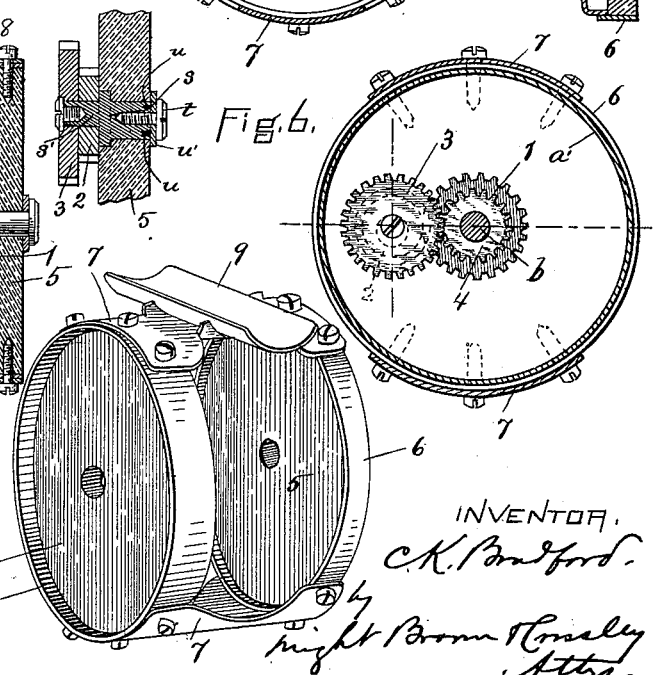
WITNESSES.
Horace Brown
A. D. Harrison
INVENTOR.
C. K. Bradford.
by Knight Brown & Quinby
Attys.

UNITED STATES PATENT OFFICE.

CHARLES K. BRADFORD, OF LYNNFIELD, ASSIGNOR TO WILLIAM F. KAKAS, OF BOSTON, MASSACHUSETTS.

FISHING-REEL.

SPECIFICATION forming part of Letters Patent No. 403,733, dated May 21, 1889.

Application filed December 13, 1888. Serial No. 293,473. (No model.)

*To all whom it may concern:*

Be it known that I, CHARLES K. BRADFORD, of Lynnfield, in the county of Essex and State of Massachusetts, have invented certain new and useful Improvements in Fishing-Reels, of which the following is a specification.

This invention has for its object, first, to provide an improved mounting or holder for reels of fishing-rods, whereby lightness and strength are secured, together with economy of construction; and, secondly, to provide improved means for imparting motion to the drum or spool of a reel from the shaft thereof.

To these ends my invention consists in the improvements which I will now proceed to describe and claim.

Of the accompanying drawings, forming a part of this specification, Figure 1 represents a perspective view of a reel embodying my improvements. Fig. 2 represents a side view of the same. Fig. 3 represents an end view. Fig. 4 represents a section on line $x\,x$, Fig. 2. Fig. 5 represents a section on line $y\,y$, Fig. 3. Fig. 6 represents a section on line $z\,z$, Fig. 5. Fig. 7 represents a perspective view of the frame or mounting without the spool or drum. Fig. 8 represents an enlargement of a portion of Fig. 5.

The same letters of reference indicate the same parts in all the figures.

In the drawings, $a$ represents the spool or drum on which the line is wound, the same having the heads or flanges $a'\,a'$.

$b$ represents the shaft, extending through the spool and through its flanges. The shaft has a crank, $b'$, at one end, whereby it may be rotated.

The frame or mounting which supports the spool and its shaft is composed of two circular end plates, 5 5, two rings or bands, 6 6, attached to the peripheries of said end plates, and tie-pieces 7 7, which are arched or bent to conform to the curvature of the peripheries of the rings 6 6, and are screwed to said rings at several points, thus securely connecting the same, the whole constituting a frame or mounting which combines lightness and strength and affords large openings through which access can be had to the drum and to the line wound thereon, only two tie-plates 7 being required, so that the unobstructed spaces through which the drum may be reached are practically as wide as the diameter of the spool-heads $a'$, as shown in Figs. 1 and 2. The rings 6 6 and tie-plates 7 7 may be made of sheet metal, and the end plates or disks, 5 5, are preferably made of hard rubber, although they may be made of sheet metal or any other suitable material. The rings 6, being internally supported by the end plates, 5, cannot be easily indented or distorted by external pressure. The arched or bent form of the tie-plates 7, enabling the latter to be attached at several points to the peripheries of the rings 6 6, gives said tie-plates sufficient strength and stiffness to resist any blows or inward pressure to which they are likely to be subjected. I prefer to cut away the edges of the lower tie-plate for the better accommodation of the line, as shown in Figs. 1 and 2. The other tie-plate is bent up to form ears 8 8, on which the attaching-plate 9 bears, said attaching-plate being riveted to the center of the tie-plate, as shown in Fig. 4.

The shaft $b$ has its bearings in the end plates, 5 5, and the spool is supported on the shaft and is connected therewith through a series of multiplying-gears, 1 2 3 4, whereby the rotation of the shaft is multiplied and the speed of the drum accelerated. The first gear, 1, is affixed to the shaft $b$ and meshes with the smaller second gear, 2, which is mounted on a stud, $s'$, affixed to one of the end plates of the frame or mounting. The third gear, 3, is affixed to the second gear, 2, and rotates with the latter on the stud $s'$, and is larger than said second gear. The fourth gear, 4, is mounted loosely on the shaft $b$ beside the first gear, and is affixed to one of the ends or heads $a'$ of the spool and meshes with the third gear. The several gears are so proportioned that one rotation of the shaft causes several rotations of the spool. The stud $s'$, on which the second and third gears, 2 3, are mounted, is formed eccentrically on a supporting-stud, $s$, which is fitted in a socket on one of the frame end plates, 5, and is clamped to said plate by means of a screw, $t$, and washer $u'$. (See Fig. 8.) When said screw is removed, the stud $s$ may be rotated, holes $u\,u$ being formed in its outer end to receive the projections of a spanner or wrench. The rotation of the stud $s$ moves the eccentric stud $s'$ and the gears 2 3 thereon toward or away from the gears 1 4, as the case may be, and thus enables said gears 2-3 to be adjusted as to the depth of their engagement with the gears 1 4. Provision is thus made for insuring a proper engagement of said gears and compensating for wear of their teeth.

The described improvements relating to the frame or mounting are not limited to a reel in which the spool is engaged with the shaft by multiplying-gears, but may be used in a reel otherwise of any suitable construction—for example, that shown in Letters Patent No. 384,742, dated June 19, 1888.

I claim—

1. In a fishing-reel frame or mounting, the combination of the sheet-metal end rings or bands, the spool-supporting end plates made in separate pieces from said rings and secured therein, and the arched or bent sheet-metal tie-plates secured to and bridging the space between the rings and having elongated bearings on said rings, said tie-plates being made separately from said rings and secured thereto by screws or other suitable fastenings, as set forth.

2. A frame or mounting composed of the disks or end plates, the rings affixed thereto and internally supported thereby, the arched or bent tie-plates secured to and connecting said rings, one of said plates being provided with ears 8 8, and the pole-attaching plate bearing on said ears and attached to the tie-plate on which the same are formed, as set forth.

3. In a fishing-reel, the combination of a frame or mounting, a shaft journaled therein, a spool mounted on said shaft, and a system of gearing connecting the shaft and spool, whereby the rotation of the shaft is multiplied in being communicated to the spool, as set forth.

4. The frame or mounting having the end plates, 5, the shaft journaled in said end plates, the spool mounted on the shaft, the eccentric stud $s'$, supported by one of the end plates, the gears 2 3, mounted on said stud and rendered adjustable thereby, and the gears 1 4, affixed, respectively, to the shaft and spool and meshing, respectively, with the gears 2 3, as set forth.

In testimony whereof I have signed my name to this specification, in the presence of two subscribing witnesses, this 7th day of December, A. D. 1888.

CHAS. K. BRADFORD.

Witnesses:
C. F. BROWN,
A. D. HARRISON.